United States Patent [19]

Havlovitz

[11] Patent Number: 5,285,971
[45] Date of Patent: Feb. 15, 1994

[54] HAND HELD SPREADER
[75] Inventor: Paul Havlovitz, Escondido, Calif.
[73] Assignee: Republic Tool & Mfg. Corp., Carlsbad, Calif.
[21] Appl. No.: 5,300
[22] Filed: Jan. 19, 1993
[51] Int. Cl.5 ............................................. A01C 17/00
[52] U.S. Cl. .................................. 239/686; 239/526; 222/43; 222/470
[58] Field of Search ............... 239/686, 684, 665, 653, 239/652, 375, 378, 379, 687, 71, 73; 222/470, 472, 473, 43, 44

[56] References Cited

U.S. PATENT DOCUMENTS

| | | |
|---|---|---|
| 96,347 | 11/1869 | Price . |
| 1,166,476 | 1/1916 | Parrish ................................. 239/653 |
| 2,514,962 | 7/1950 | McElhatton . |
| 2,804,309 | 8/1957 | Sweet . |
| 3,157,402 | 11/1964 | Love, Jr. ............................... 239/686 |
| 3,227,461 | 1/1966 | Love, Jr. ............................... 239/686 |
| 3,368,762 | 2/1968 | Dreyer .................................. 239/665 |
| 3,592,368 | 7/1971 | Huette .................................. 222/239 |
| 3,979,071 | 9/1976 | Biggs, Jr. .............................. 239/653 |
| 4,492,341 | 1/1985 | Allen .................................... 239/686 |
| 4,609,153 | 9/1986 | Van der Lely ....................... 239/665 |
| 4,628,644 | 12/1986 | Somers ................................. 239/378 |
| 5,123,598 | 6/1992 | Courtney et al. .................... 239/686 |

Primary Examiner—Karen B. Merritt
Attorney, Agent, or Firm—Harry Williams

[57] ABSTRACT

A hand held spreader having the bottom-face of the hopper portion at an angle with respect of the horizontal and having the handle for holding the device disposed directly below the hopper and so directly below the weight of the hopper; the handle is angled so as to afford an in-line action between the trigger of the handle and the slide of a dispensing mechanism, thus avoiding any requirement or a linkage between the trigger and the slide mechanism. Also the gear-box portion of the device is of a simple clam-shell design that allows the rotary drive shaft of the device to be removably supported on opposite sides of its load bearing section by means of bearing supports on both sides of at least one of the gears. The supports are part of the separate halves of the housing itself, thus avoiding the need for additional or separate bearing structures. A rotor disc is also provided having blade members strategically disposed thereon in a manner that avoids interference with the deposition of material on the surface of the disc.

8 Claims, 4 Drawing Sheets

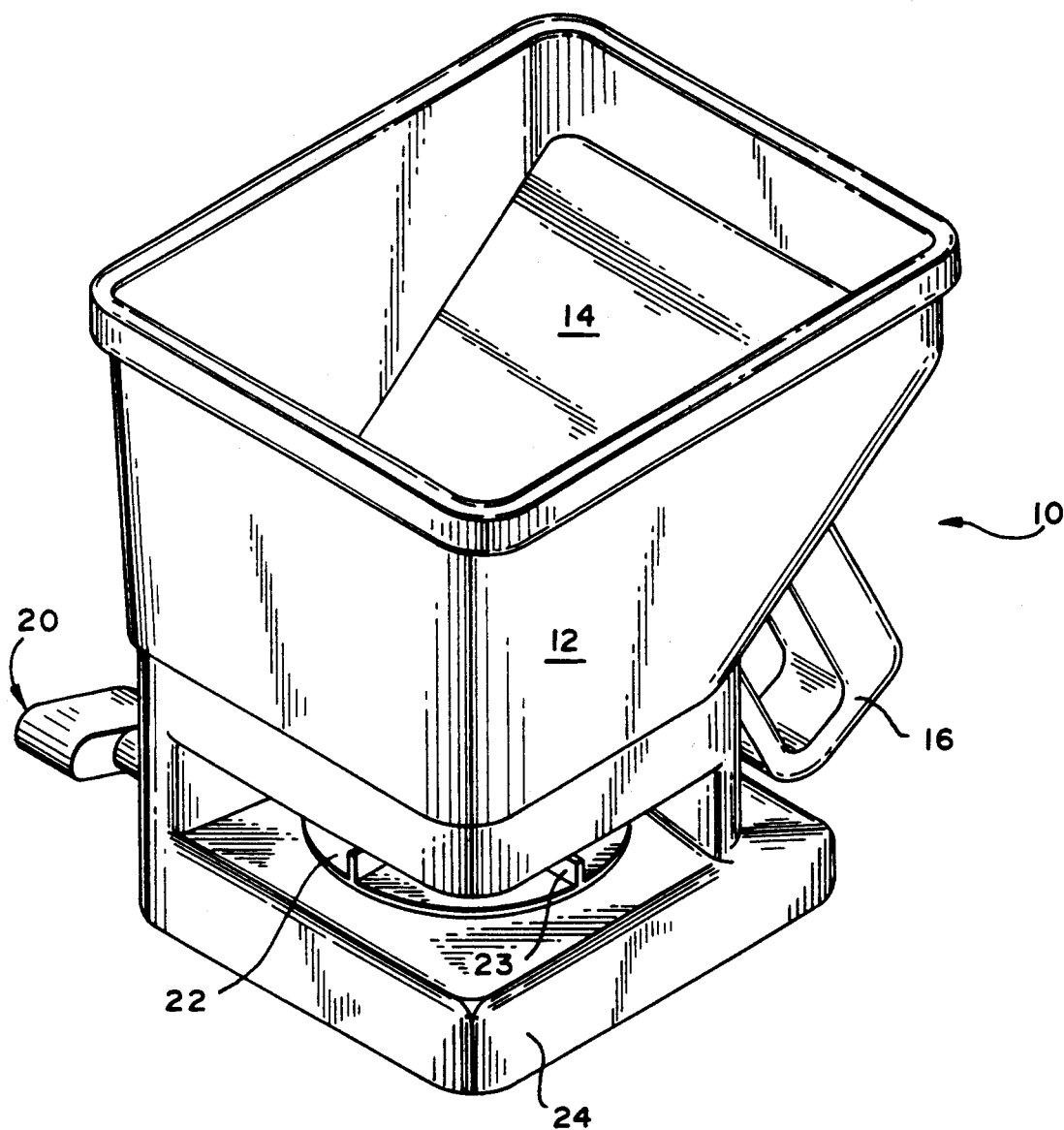
FIG_1

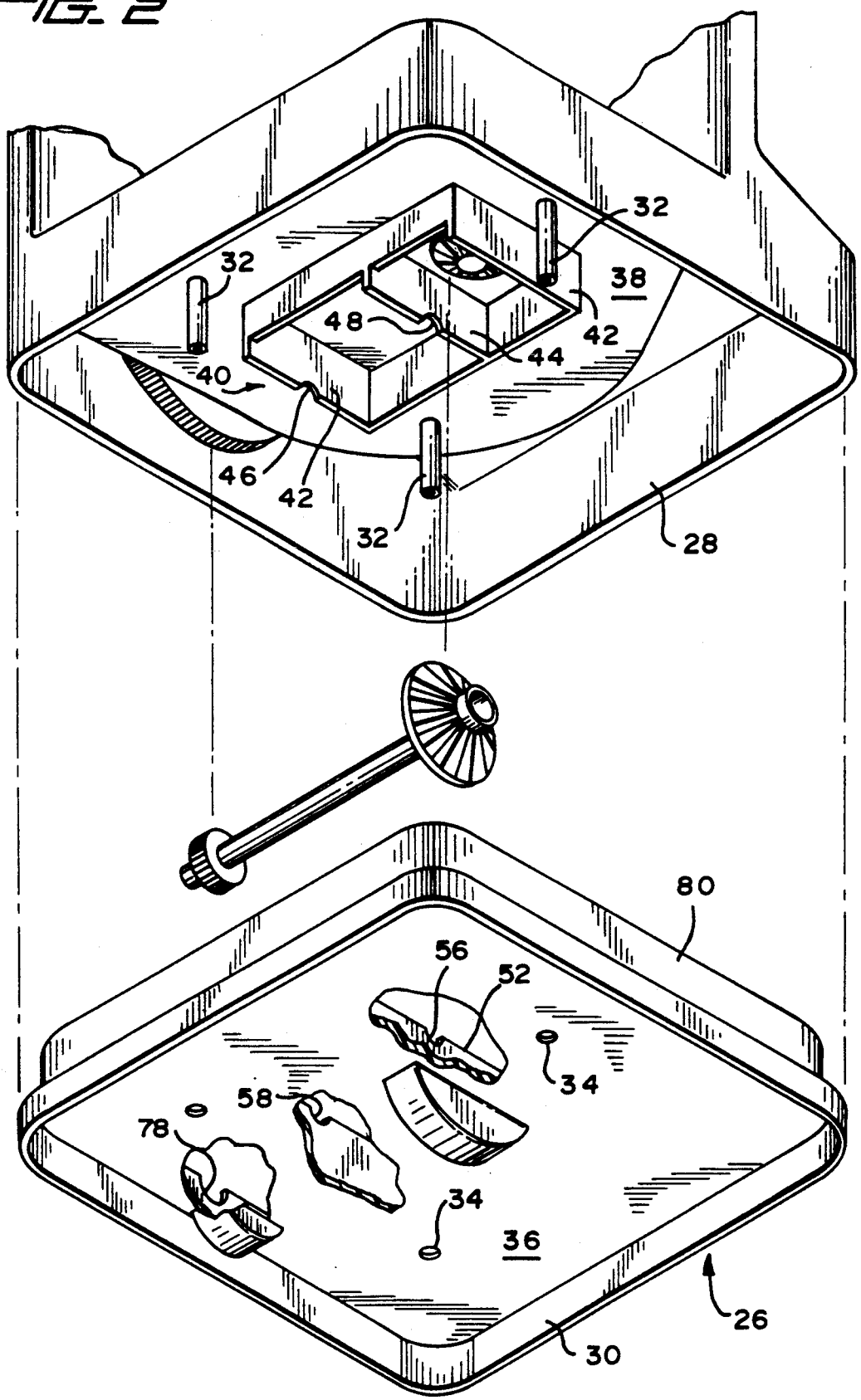

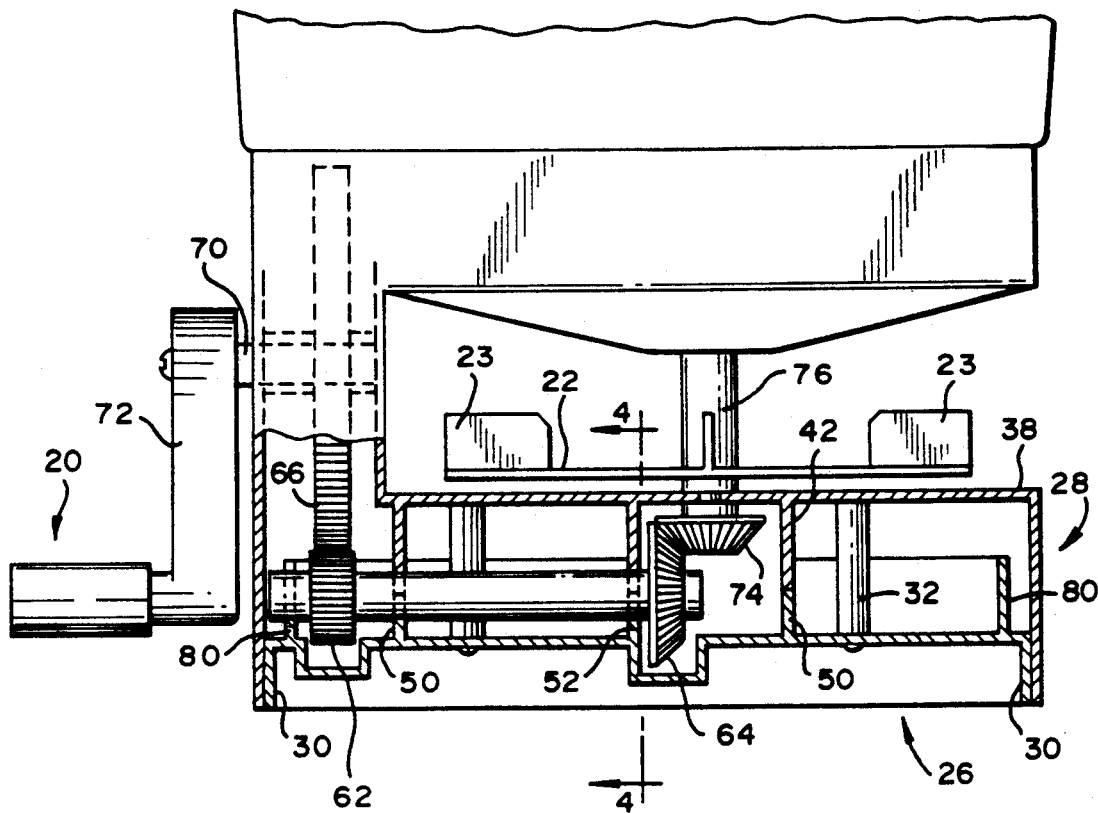
FIG_3
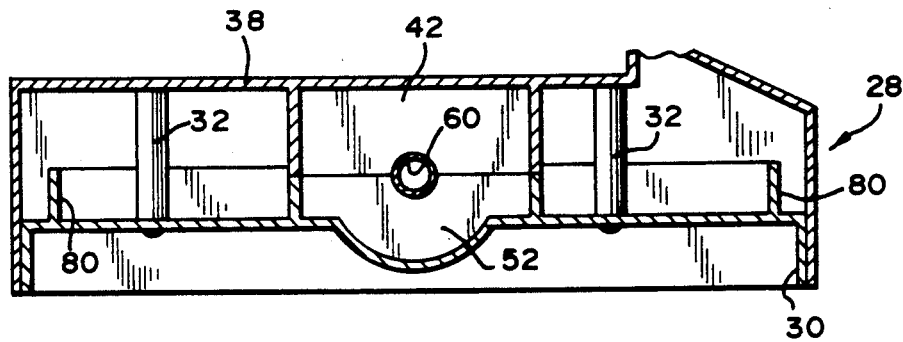
FIG_4

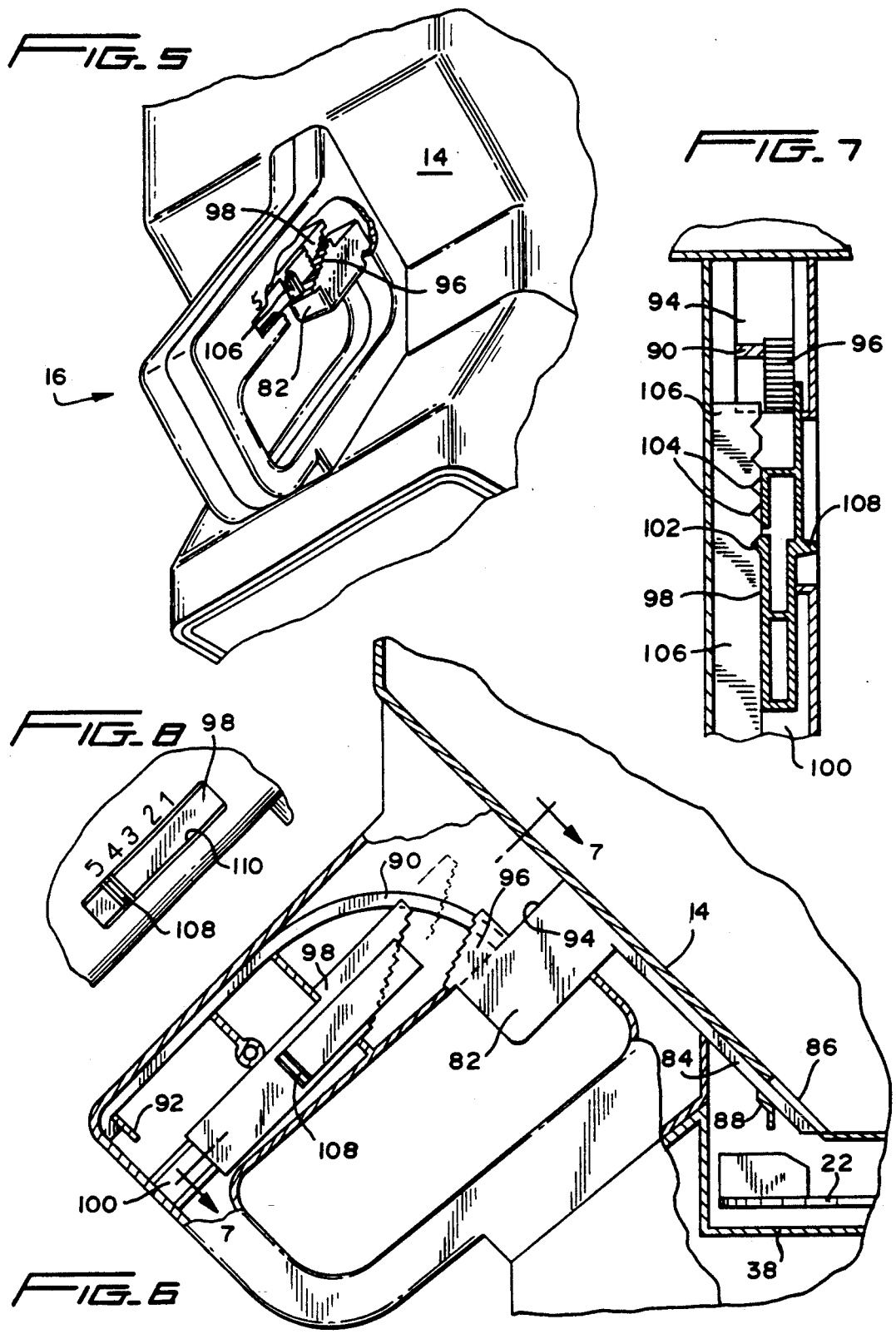

HAND HELD SPREADER

BACKGROUND OF THE INVENTION

This invention relates to mechanically-operated hand held spreaders of broadcasting lawn fertilizer and grass seed and other products suitable for dispersing over the ground.

Normally, hand held spreaders of the present kind are small enough to be held by hand while carrying a load of seed or fertilizer so ah the operator can walk over the ground to be treated and at the same time operate at suitable crank to disperse the contents of the spreader. In view of this compound action—holding, walking and turning a crank—required of the operator of such devices, there is a need to provide a hand held spreader which is easy to use, that is economic in design, efficient in operation, and is simply constructed so as to afford trouble-free operation.

OBJECTS AND SUMMARY OF THE INVENTION

It is a primary purpose and principle object of the present invention to provide, therefore, a hand held spreader which is economically designed to afford maximum comfort to the operator as well as maximum efficiency of construction and operation.

It is another feature of the present invention to provide a hand held spreader which is constructed with a minimum number of moving parts and which parts are arranged in an efficient manner for load-bearing efficiency so as to afford trouble-free operation.

It is another feature of the present invention to provide a hand held spreader in which an in-line trigger handle and dispensing mechanism disposed directly below the hopper precludes the need for complicated linkage between trigger and dispenser and also affords efficient weight distribution of the material in the hopper directly over the hand.

It is yet another feature of the present invention to provide a motor disc construction which allows the material to be efficiently disposed on the disc before being broadcast.

It is still another feature of the present invention to provide a hand held spreader which is constructed entirely form plastic parts, including the motion transmitting parts, and in which the moving parts themselves do not require separate bearing structures and can be easily removed for cleaning and repair.

According to one embodiment of the invention other is provided a hand held spreader in which the bottom-face of the hopper portion of the invention is at an angle with respect to the horizontal and hence the ground, and that the handle for holding the device is disposed at eight angles to that angle so as to afford an in-line, economic movement of the dispensing mechanism of the hopper. With this arrangement the triggering action of the handle system will be along the same line of angle as the bottom face of the hopper, an arrangement which allows direct in-line action for the trigger mechanism and so avoids the need for a mechanical linkage system, such as a bell-crank lever and the like, that would otherwise be required to negotiate a change of direction—a corner, curve, radius, for example—for a conventional horizontally disposed handle. Further, the present design also allow the weight of the material in the upper to be directly over the hand rather than to be extended forwardly of the hand as in conventional designs. In this way, too, the hand's support of the material in the hopper is enhanced for greater control than would otherwise be allowed if the hand had to support that same weight extended, as on a lever. Also the gear-box portion of the device is of a simple clam-shell design that allows the removable rotary drive shaft of the device to be supported on opposite sides of its load bearing section by means of integrated supports in the clam-shell housing itself without the need for separate bearing structures. Finally, the rotor disc for broadcasting the material from the hopper is designed to have its central portion free of any interference so that the material from the hopper can be fed directly to the central portion, deposited there first before being shifted centrifugally to the peripheral bladed portion of the disc.

The invention will be better understood as well as further objects and advantages thereof become more apparent from the ensuing detailed description taken in conjunction with the drawings.

BRIEF DESCRIPTION OF THE DRAWINGS

FIG. 1 is a schematic perspective of the present invention;

FIG. 2 is a schematic perspective in explosion and partly broken showing the gear-box construction;

FIG. 3 is a schematic side elevation partly in cross-section of the gear-box housing;

FIG. 4 is a cross section taking along the lines 4—4 in FIG. 3;

FIG. 5 is a schematic perspective partly broken away of the handle portion of the present invention;

FIG. 6 is a schematic side elevation partly broken away of the handle portion of the present invention;

FIG. 7 is a cross-section taking along line 7—7 in FIG. 6; and

FIG. 8 is detail of the handle shown in FIG. 5.

DETAILED DESCRIPTION

Referring now to FIGS. 1-4 there is shown a hand spreader 10 having a hopper portion 12 that is characterized by a sloped bottom face 14. A handle 16 is shown for manually gripping the spreader with one hand, while the other hand is intended to operate a rotary crank handle 20 which turns the spreader disc 22 by means of hearing in the clam-shell gearbox housing 24. The rotor disc 22, of course, broadcasts the material in the hopper.

The clam-shell housing 24 is shown in greater detail in FIGS. 2-4 wherein it is seen that the housing comprises a bottom bald 26 and a top half 28 which are designed to fit snugly together by means of a flange member 30 on the bottom half 26, which flange fits within the inner peripheral wall surface of the top half 28, as best shown in FIGS. 3 and 4. Suitable screws secure the two halves together by means of the mounting posts 32 cooperating with the apertures 34 in the bottom face plate 36. Disposed in a depending disposition from the top face plane 38 of the top or upper housing half 28 is a box-like structure 40 having depending walls 42 and an intervening wall 44 parallel with the two end walls 42. The intervening wall 44 is seen to have a cut-out bearing portion 48 of a semicircular configuration, as does one of the end walls 42, as shown at 46, to be explained below. The walls 42, 44 have their counterparts in the bottom half 26 of the gear housing in upstanding walls 50, and 52, and the cut-out portions 46, 48 find their respective counterparts in cut-out bearing portions 56 and 58 in the upstanding walls 50 and 52 (see FIGS. 2 and 3). When the respective walls just described come in contact, as shown in FIG. 3, the define split bearing apertures in which a shaft member 60 is disposed for rotary support. The member 60 is seen to have a gear wheel 62 near one end thereof and a beveled gear 64 near the other end thereof. Both gear members are seen to be accommodated by suitable well portions formed in the bottom face plate 36 of the bottom half housing 26. The gear wheel 62 is a load bearing gear wheel because it meshes with the lager gear wheel 66 which is supported for rotary movement on a suitable shaft 70 to which the handle member 72 is attached. The handle mechanism 20 operates in a conventional manner and, of course, transfers rotary energy to the wheel 66 and chance to the load bearing wheel 62. The beveled gear 64 of the shaft member 60 is seen to mesh with a corresponding beveled gear 74 fixedly attached to a suitable shaft 76 which extends through the upper face plate 38 and supports in a conventional manner the rotary seed or material distributor disc 22. It will be seen that the rotor disc supports upstanding blade members 23 (see FIGS. 1 and 3) that occupy only the peripheral portion of the rotor disc 22; that is, a central area of the rotor disc is free of the upstanding blade structure. Normally, such blades in conventional designs occupy the central portion, as well, or a major part of it, so that the blades tend to throw off the descending material into the center of the disc too quickly before the material can reach the outer portion of the disc for a more efficient spread. In order, then, to avoid this problem, the present invention allows the material to accumulate first on the central portion the disc, which is blade-free, where it can then shift to the outer or peripheral portion by the normal centrifugal action of the disc and then be efficiently scattered or broadcast by the action of the blades acting on all of the material.

Specific to the invention is the provision of a further cut-out support bearing 78 in an upstanding side wall 80 extending up from the bottom face plate 36 of the bottom-half housing 26. The bearing support cut-out 78 is in-line with the outer two bearing support cut-outs 46, 48 and together with them supports the rotary shaft member 60 in three strategic locations, thus on both sides of the load-bearing gear wheel 62 (and thus on both sides of the load-bearing portion of the shaft) and at the third location adjacent the beveled gear 64. Thus, the shaft member 60 is securely supported with an optimum balancing of forces for rotation in a simple and efficient manner. Because of the strategically placed bearing support slot or cut-out 78 on the far side of the shift adjacent the load bearing gear wheel 62, the shaft 60 (together with its gear wheels) can be easily inserted in the manufacturing process when the two halves of the clam-shell housing are separate, or it can be easily removed for repair, replacement or cleaning, again when the clam-shell halves are separated. The bearing support 78 is an open cut-out portion in wall 80 and does not have a complementary bearing support in the upper half of the clam-shell housing, as does the cut-out bearing supports 56 and 58. The shaft 60, then, is seen to be removably supported by the upstanding walls of the clam-shell housing 26, 28 without the need for separate bearing structures.

In FIGS. 5–7 are shown the economically designed handle for the hand held spreader according of the invention. Of particular importance is the orientation of the bottom face 14 of the hopper 12 and its relationship to the orientation of the handle 16; that is, both the axis of the handle and the bottom face of the hopper are sloped with respect to the horizontal, roughly 45 degrees. This arrangement allows the trigger 82 to be in-line with a slide member 84 and to pull the slide member past the aperture 86 located at one end of the bottom face 14 of the hopper (see FIG. 6). The slide member 84 is supported at one end by a depending member 88, and the trigger is biased in the forward direction by a plastic spring member 90 which is secured at one of tis kinked or bent ends in the bottommost portion of the handle by a suitable stud or post member 92, while its other end is free to ride along a flat surface 94 of the trigger 82 (see FIG. 7) as the trigger is pulled backward against the bias of the spring member 90. Adjacent the surface 94 is a stepped portion 96 of the trigger 82 which cooperates with another complementary stepped portion 98 that is slidably mounted within the handle as by means of a channel 100 located therein. The movable stepped portion 98 has a wall member 102 which cooperates with a series of detents 104 spaced along an interior wall section 106 adjacent to the movable stepped member 98 and the channel 10 in which it slides. A gripping member or stud 108 extends through an aperture 110 and allows the movable stepped member 908 to be manually moved and set in any one of five positions, as shown in FIG. 8, the five positions, of course, corresponding of the five detents 104. Depending upon where the movable stepped member 98 is set (in either one of the five positions) will determine to what degree the fixed stepped member on trigger 82 will abut against the movable stepped member and thus determine the degree to which the trigger can be pulled back, that is, the degree to which the slide 84 opens the aperture 86 in the hopper and thus regulate the amount of material in the hopper to be dispensed through the opening. Since the dispensing aperture 86 is in the bottom most part of the hopper (see FIG. 6), all the material will collect at that point for dispensing to the rotor disc below.

It will be seen that when the trigger is pulled back the slide member is directly pulled with it in the same plane of movement as the trigger which is in line with the slope of the bottom face 14 of the hopper and in a direction opposite to the downward flow of the material in the hopper. This in-line arrangement avoids the need for providing a mechanical linkage system, such as a bell-crank and the like, that a trigger mechanism would require for an off-line system in which the handle is disposed at a different angle from the dispensing mechanism in the hopper. This arrangement also has the advantage of allowing the material in the hopper to be always flowing away from the upward pull of the slide, that is, in a downward opposite direction that prevents clogging of the movable parts and interstices that define the structure of the slide and the aperture. Also the hand holding the handle, according of the invention, is disposed in its natural sloped disposition, as will be evident when one holds out one's hand in a clenched-first but comfortable position and observes the attitude of the curled fingers. If one then works his or her trigger finger, one will notice at the motion of the finger is in a plane that is sloped approximately 45 degrees with the horizontal, that is, the same angle of slope in which the material is being dispensed from the hopper onto the rotor disc. With this arrangement, then, the attitude of the hand and the flow of material from the hopper is the same and hence economically agreeable, that is, the in-line arrangement of the handle, the trigger movement and the gravity-directed a direction of material flow from the hopper. This in-line action of the slide and trigger also precludes the requirement for a linkage system (bell-crank lever etc.) to negotiate any corners or curves that would be otherwise encountered if the handle were disposed at an angle with respect to the bottom face of the hopper or the in-line action of the slide. Also, the weight of the material in the hopper is directly over the and rather than extended forwardly of the hand as in conventional designs In this way the hand's support of the material in the chopper is enhance for greater control than would otherwise be allowed if the hand had to support that same weight extended, as one a lever. the foregoing relates to preferred exemplary embodiment of the present invention, it being understood that other methods and variants thereof are possible within the scope of the invention, the latter being defined by the appended claims.

What is claimed and desired to be secured by Letters Patent of the United States is:

1. A hand held spreader comprising,
    a hopper,
    a dispensing aperture in said hopper,
    a rotor disc disposed below said hopper for broadcasting material dispensed from said aperture,
    a clam-shell housing for a gear assembly disposed below said rotor disc for rotating said rotor disc in response to a handle member rotatably connected to said gear assembly,
    said gear assembly including a shaft having a pair of gear wheels disposed thereon,
    said clam-shell housing having a bearing support means in each half of said clam-shell housing for providing a support for said shaft and allowing said shaft to be freely removed with the removal of both halves of said clam-shell housing, and
    said bearing support means being disposed on both sides of at least one of said gear wheels.

2. A hand held spreader according to claim 1, wherein said at least one of said gear wheels is a load bearing driven gear wheel.

3. A hand held spreader according to claim 1, wherein said hopper has a bottom face which is sloped with respect to the horizontal and said dispensing aperture being located in said bottom face.

4. A hand held spreader according to claim 3, further comprising a handle assembly for said spreader dispose along said bottom face of said hopper and directly below said hopper in a generally downward direction, whereby the weight of material in said hopper is directly above said handle assembly, said handle assembly having a trigger means for operating a slide member to slide past said aperture from a position completely covering said aperture to completely opening said aperture, and said slide member and said trigger means being movable in-line in a plane that is parallel with said sloped bottom face of said hopper.

5. A hand held spreader comprising,
    a hopper having a bottom face sloped with respect to the horizontal,
    a dispensing aperture in said hopper,
    a handle assembly for said spreader disposed along said bottom face of said hopper and directly below said hopper in a generally downward direction whereby the weight of material in said hopper is directly above said handle assembly, said handle assembly having a trigger means for operating a slide member to slide past said aperture from a position completely covering said aperture to completely opening said aperture, and
    said slide member and said trigger means being movable in-line in a plane that is parallel with said sloped bottom face of said hopper.

6. A hand held spreader according to claim 5, further comprising, a rotor disc disposed below said hopper for broadcasting material dispensing from said aperture, drive means for rotating said rotor disc, said dispensing aperture being located above a central portion of said rotor disc, said rotor disc being provided with a plurality of upstanding blades arranged on a peripheral portion of said rotor disc, said central portion of said rotor disc being free of said blades, whereby material descending from said hopper to said central portion of said rotor disc is allowed to accumulate on said central portion of said rotor disc before being centrifugally shifted to said peripheral blade-bearing portion of said rotor disc.

7. A hand held spreader according to claim 6, further comprising a clam-shell housing for a gear assembly disposed below said rotor disc, said gear assembly including a shaft having a pair of gear wheels disposed thereon, said clam-shell housing having a bearing support means in each half of said clam-shell housing for providing a support for said shaft and allowing said shift to be freely removed with the removal of both halves of said clam-shell housing, and said bearing support means being disposed on both sides of at least one of said bear wheels.

8. A hand held spreader comprising,
    a hopper having a bottom face sloped with respect to the horizontal,
    a dispensing aperture in said hopper,
    a rotor disc disposed below said hopper for broadcasting material dispensed from said aperture,
    a housing for a gear assembly disposed below said rotor disc for rotating said rotor disc in response to a handle member rotatably connected to said gear assembly,
    a handle assembly for said spreader disposed along said bottom face of said hopper in a generally downward direction, whereby the weight of material in said hopper is directly above said handle assembly, said handle assembly having a trigger means for operating a slide member to slide past said aperture from a position completely covering said aperture to completely opening said aperture, and
    said slide member and said trigger mans being movable in-line in a plane that is parallel with said sloped bottom face of said hopper.

* * * * *

UNITED STATES PATENT AND TRADEMARK OFFICE
CERTIFICATE OF CORRECTION

PATENT NO. : 5,285,971
DATED : Feb. 15, 1994
INVENTOR(S) : Paul Havlovitz

It is certified that error appears in the above-indentified patent and that said Letters Patent is hereby corrected as shown below:

```
col. 2, line 47, change "hearing" to --gearing-- col. 5, line 12, change "and" to --hand--
        line 13, insert a period after "designs"
        line 14, change "chopper" to --hopper--
and "enhance" to --enhanced--
        line 17, change "one" to --on-- and "the"
to --The-- and begin a new paragraph with "The"
```

Signed and Sealed this

Second Day of January, 1996

Attest:

BRUCE LEHMAN

*Attesting Officer*  Commissioner of Patents and Trademarks